US012030200B2

(12) United States Patent
Kim et al.

(10) Patent No.: US 12,030,200 B2
(45) **Date of Patent: *Jul. 9, 2024**

(54) RAZOR CARTRIDGE

(71) Applicant: DORCO CO., LTD., Seoul (KR)

(72) Inventors: Dong Il Kim, Seoul (KR); Woo Gyeong Go, Seoul (KR)

(73) Assignee: Dorco Co., Ltd., Seoul (KR)

( * ) Notice: Subject to any disclaimer, the term of this patent is extended or adjusted under 35 U.S.C. 154(b) by 3 days.

This patent is subject to a terminal disclaimer.

(21) Appl. No.: 18/058,730

(22) Filed: Nov. 23, 2022

(65) Prior Publication Data

US 2023/0158694 A1 May 25, 2023

Related U.S. Application Data

(63) Continuation of application No. 15/983,687, filed on May 18, 2018, now Pat. No. 11,518,054, which is a continuation of application No. PCT/KR2015/012523, filed on Nov. 20, 2015.

(30) Foreign Application Priority Data

Nov. 20, 2015 (KR) ........................ 10-2015-0162970

(51) Int. Cl.

*B26B 21/40* (2006.01)
*B26B 21/14* (2006.01)
*B26B 21/22* (2006.01)

(52) U.S. Cl.

CPC .......... *B26B 21/4012* (2013.01); *B26B 21/14* (2013.01); *B26B 21/22* (2013.01); *B26B 21/222* (2013.01); *B26B 21/40* (2013.01); *B26B 21/4043* (2013.01)

(58) Field of Classification Search

CPC ............ B26B 21/4012; B26B 21/4018; B26B 21/4043; B26B 21/222; B26B 21/225

USPC ................................ 30/34.1, 30, 31, 77, 537

See application file for complete search history.

(56) References Cited

U.S. PATENT DOCUMENTS

| | | | |
|---|---|---|---|
| 2,374,612 A | 4/1945 | Mellon | |
| 4,901,437 A | 2/1990 | Iten | |
| 5,133,131 A | 7/1992 | Hoffman | |
| 5,687,485 A | 11/1997 | Shurtleff et al. | |

(Continued)

FOREIGN PATENT DOCUMENTS

| | | |
|---|---|---|
| JP | S4825996 | 3/1973 |
| JP | 4782776 | 9/2011 |

(Continued)

OTHER PUBLICATIONS

European Patent Office Application Serial No. 15908857.4, Search Report dated Apr. 12, 2019, 8 pages.

(Continued)

*Primary Examiner* — Laura M Lee

(74) *Attorney, Agent, or Firm* — Knobbe Martens Olson & Bear LLP

(57) ABSTRACT

A razor cartridge includes a plurality of razor blades installed in one direction of a cartridge frame, and a trimmer installed in the other direction of the cartridge frame, wherein the trimmer includes a trimming blade seated in a seating groove formed in the cartridge frame, and a trimmer cap coupled to both sides of the cartridge frame so that the trimming blade is fixed.

15 Claims, 14 Drawing Sheets

(56) References Cited

U.S. PATENT DOCUMENTS

| | | | |
|---|---|---|---|
| 5,761,814 A | 6/1998 | Anderson et al. | |
| 5,956,848 A | 9/1999 | Tseng et al. | |
| 5,956,851 A | 9/1999 | Apprille et al. | |
| 6,041,926 A | 3/2000 | Petricca et al. | |
| 6,052,903 A | 4/2000 | Metcalf et al. | |
| 6,185,822 B1 | 2/2001 | Tseng et al. | |
| 6,212,777 B1 | 4/2001 | Gilder et al. | |
| 6,442,839 B1 | 9/2002 | Tseng et al. | |
| 6,516,518 B1 | 2/2003 | Garraway et al. | |
| 6,612,040 B2 | 9/2003 | Gilder | |
| 6,684,513 B1 | 2/2004 | Clipstone et al. | |
| 9,032,627 B2 | 3/2015 | Dimitris et al. | |
| 10,093,031 B2 | 10/2018 | Ren | |
| 10,377,051 B2 | 8/2019 | Bozikis et al. | |
| 10,406,706 B2 | 9/2019 | Liberatore | |
| 11,518,054 B2 * | 12/2022 | Kim | B26B 21/4012 |
| 2005/0039337 A1 | 2/2005 | Pennell et al. | |
| 2009/0188112 A1 | 7/2009 | Prochaska et al. | |
| 2010/0071215 A1 | 3/2010 | Wonderlay | |
| 2011/0023305 A1 | 2/2011 | Whelan et al. | |
| 2014/0026422 A1 | 1/2014 | Lau | |
| 2017/0282385 A1 | 10/2017 | Bozikis et al. | |
| 2018/0264665 A1 | 9/2018 | Kim et al. | |
| 2019/0168402 A1 * | 6/2019 | Efthimiadis | B26B 21/565 |

FOREIGN PATENT DOCUMENTS

| | | |
|---|---|---|
| KR | 2007-536032 | 12/2007 |
| KR | 10-2008-0068141 | 7/2008 |
| KR | 10-2009-0024254 | 3/2009 |
| KR | 10-2010-0103458 | 9/2010 |
| KR | 10-2011-0090249 | 8/2011 |
| KR | 1020110090249 | 8/2011 |
| WO | 2008023210 | 2/2008 |
| WO | 2009049216 | 4/2009 |
| WO | 2015127978 | 9/2015 |

OTHER PUBLICATIONS

International Search Report issued for corresponding International Patent Application No. PCT/KR2015/012523, dated Aug. 19, 2016, with an English translation.

U.S. Appl. No. 15/983,687, Office Action dated Sep. 25, 2019, 12 pages.

U.S. Appl. No. 15/983,687, Office Action dated Jul. 8, 2020, 15 bages.

U.S. Appl. No. 15/983,687, Office Action dated Oct. 20, 2020, 19 pages.

U.S. Appl. No. 15/983,687, Final Office Action dated Apr. 2, 2021, 17 bages.

U.S. Appl. No. 15/983,687, Office Action dated Aug. 3, 2021, 9 pages.

U.S. Appl. No. 15/983,687, Final Office Action dated Dec. 17, 2021, 6 pages.

U.S. Appl. No. 15/983,687, Office Action dated Mar. 28, 2022, 7 pages.

U.S. Appl. No. 15/983,687, Notice of Allowance dated Aug. 5, 2022, 5 pages.

European Patent Office Application Serial No. 20173928.1, Search Report dated Sep. 10, 2020, 8 pages.

National Intellectual Property Administration of the People's Republic of China Application Serial No. 201580084737.9, Office Action dated Apr. 23, 2019, 7 pages.

* cited by examiner

RAZOR CARTRIDGE

CROSS-REFERENCE TO RELATED APPLICATIONS

This application is a continuation of U.S. patent application Ser. No. 15/983,687, filed on May 18, 2018, which is a continuation of PCT/KR2015/012523, filed Nov. 20, 2015 and is related to and claims the priority under 35 U.S.C. § 119(a) to Korean Application Serial No. 10-2015-0162970, which was filed in the Korean Intellectual Property Office on Nov. 20, 2015, the entire content of which is hereby incorporated by reference.

FIELD

The present disclosure relates to a razor cartridge, and more particularly, to a razor having a plurality of razor blades for shaving a beard or mustache, and a trimmer for shaving sideburns or facial hair that has grown on a curved part of the face such as under the nose.

BACKGROUND

In recent years, there has been an increase in the provision of razor cartridges having multiple razor blades as a way to reduce skin irritation by reducing the number of times the razor blades and the skin come into contact during shaving.

In other words, there has been an increase in the provision of razor cartridges in which a plurality of razor blades are disposed at predetermined intervals so that, even when the number of times the razor blades come into contact with the skin is reduced, cleaner shaving is possible with the multiple razor blades.

However, in the case of such a razor cartridge having multiple razor blades, since a plurality of razor blades are installed at predetermined intervals, an area of the razor cartridge accommodating the multiple razor blades is inevitably widened, and thus there is a problem in that it is difficult to easily shave facial hair that has grown on a curved part of the face such as under the nose.

Accordingly, in recent years, there has been an increase in the supply of razor cartridges having a trimmer with a separate trimming blade formed in a direction opposite that of multiple razor blades so that it is easy to shave sideburns or facial hair that has grown on a curved part of the face such as under the nose.

In the case of such a conventional razor cartridge having a trimmer, since the trimming blade is not stably fixed to the razor cartridge, durability is reduced, and thus the razor cartridge does not function properly in many cases, and particularly, there is a problem in that, since the thickness of a part of the razor cartridge at which the trimming blade is installed is thick, it is not easy to shave facial hair that has grown on a curved part of the face such as under the nose.

The present disclosure has been made in view of the above problems, and the present disclosure is directed to providing a razor cartridge with an improved structure for fixing a trimming blade so that stability is further improved, durability of the trimming blade is improved, and it is easy to shave facial hair that has grown on a curved part of the face such as under the nose.

The objects of the present disclosure are not limited to the above-mentioned object, and other unmentioned objects should be clearly understood by those of ordinary skill in the art from the following description.

PATENT LITERATURE (Patent Literature 1) KR. Application Patent No. 10-2009-0024254

SUMMARY

To solve the above objects, one embodiment of the present disclosure provides a razor cartridge including a plurality of razor blades installed in one direction of a cartridge frame, and a trimmer installed in the other direction of the cartridge frame, wherein the trimmer includes a trimming blade seated in a seating groove formed in the cartridge frame, and a trimmer cap coupled to both sides of the cartridge frame so that the trimming blade is fixed.

The trimmer cap may be connected to the both sides of the cartridge frame by hook coupling while the trimming blade is disposed between the both sides of the cartridge frame.

The trimmer cap may comprise a body part seated in the seating groove of the cartridge frame while the trimming blade is disposed between the body part and the seating groove, and coupling parts respectively formed at both sides of the body part.

The body part and the coupling parts of the trimmer cap may be formed to be stepped so that heights of the body part and the coupling parts are different.

At both sides of the seating groove of the cartridge frame, a first coupling groove may be formed by a predetermined depth in a first direction, and a second coupling groove may be formed in a direction intersecting the first direction from an end of the first coupling groove, and the coupling parts of the trimmer cap may comprise a first coupling part configured to be inserted into the first coupling groove, and a second coupling part configured to be inserted into the second coupling groove.

The razor cartridge may further include a fixing member configured to cover upper parts of the coupling parts and fix the trimmer cap to the cartridge frame, and the fixing member may be a clip configured to surround the plurality of razor blades and the coupling parts so that the plurality of razor blades and the trimming blade are fixed to the cartridge frame.

A first positioning groove or a first positioning protrusion may be formed in the seating groove of the cartridge frame, a second through-hole that corresponds to the positioning groove or the positioning protrusion may be formed in the trimming blade, and a second positioning protrusion or a second positioning groove that corresponds to the first positioning groove or the first positioning protrusion may be formed at one surface of the body part of the trimmer cap.

At least one locking protrusion may be formed in the seating groove of the cartridge frame, a first through-hole may be formed in a position of the trimming blade corresponding to the at least one locking protrusion, and the at least one locking protrusion may pass through the first through-hole in the trimming blade for a front end of the at least one the locking protrusion to be riveted so that the trimming blade is coupled with rivets to the cartridge frame, and an accommodating space recessed by a predetermined depth may be formed in the trimmer cap for a riveted front end of the at least one locking protrusion to be accommodated therein.

The trimmer cap may be formed of an elastic material.

Combs having a predetermined height may be formed at predetermined intervals at one side of the body part of the trimmer cap, spaces may be formed between the combs.

Guide protrusions having a predetermined height at predetermined intervals and spaces between the guide protrusions may be formed at one side of the cartridge frame so that the guide protrusions and the spaces between the guide protrusions are collinear with the combs and the spaces between the combs.

The combs and the spaces may be formed symmetrically at both sides of the body part of the trimmer cap.

The razor cartridge further comprises a fixing member configured to cover upper parts of the coupling parts and fix the trimmer cap to the cartridge frame, and wherein the fixing member is a clip configured to surround the plurality of razor blades and the coupling parts so that the plurality of razor blades and the trimming blade are fixed to the cartridge frame.

Other specific details of the present disclosure are included in the detailed description and the drawings.

In a razor cartridge according to an embodiment of the present disclosure, a structure for fixing a trimming blade is improved so that safety and durability are improved, and a thickness of a part of a cartridge frame at which a trimmer is disposed can be reduced so that shaving facial hair that has grown on a curved part of the face such as under the nose is facilitated. In this way, the functionality of the razor cartridge is improved.

The advantageous effects according to the present disclosure are not limited to the above-mentioned advantageous effects, and various other advantageous effects are incorporated herein.

BRIEF DESCRIPTION DRAWINGS

While the specification concludes with claims particularly pointing out and distinctly claiming the subject matter is regarded as forming the present disclosure, it is believed that the disclosure will be better understood from the following description taken in conjunction with the accompanying drawings.

DETAILED DESCRIPTION

Figure 1:
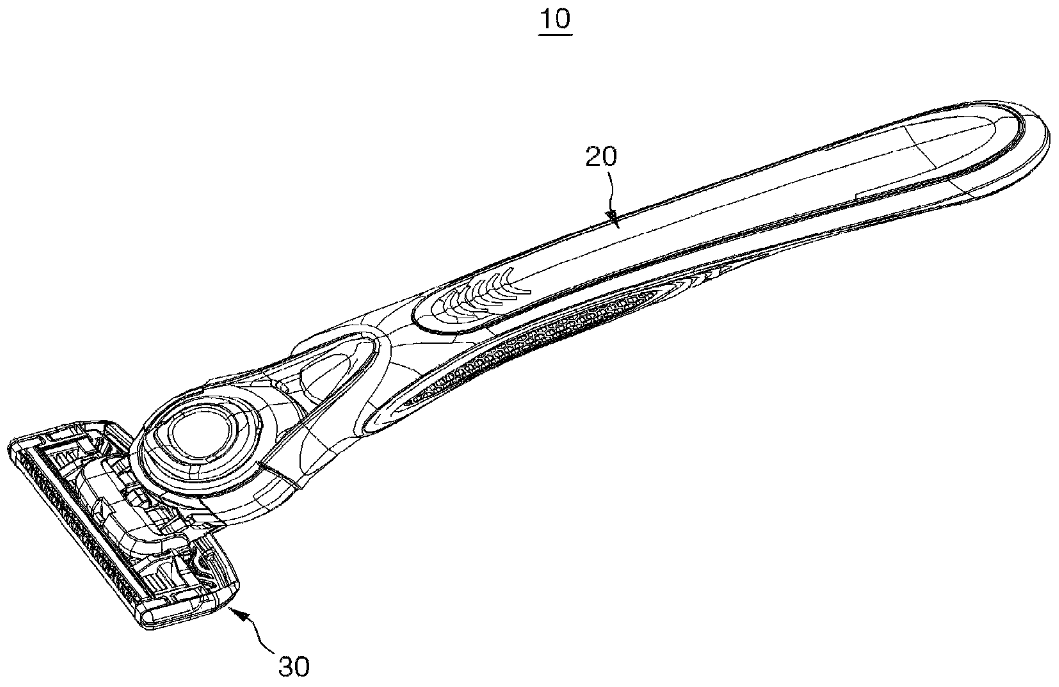
FIG. 1 is an overall perspective view of a razor according to embodiments of the present disclosure.

Advantages and features of the present disclosure and a method of achieving the same should become clear with embodiments described in detail below with reference to the accompanying drawings. However, the present disclosure is not limited to embodiments disclosed below and is realized in various other forms. The present embodiments make the disclosure of the present disclosure complete and are provided to completely inform one of ordinary skill in the art to which the present disclosure pertains of the scope of the disclosure. The present disclosure is defined only by the scope of the claims. Like elements are denoted by like reference numerals throughout.

The embodiments to be described herein will be described with reference to cross-sectional views and/or schematic diagrams, which are ideal exemplary views of the present disclosure. Therefore, the forms of the exemplary views may be changed due to manufacturing techniques and/or allowable errors. In each of the drawings of the present disclosure, each element may be somewhat exaggerated or minimized in consideration of convenience of description. Like elements are denoted by like reference numerals throughout.

Hereinafter, exemplary embodiments of a razor according to the present disclosure will be described in detail with reference to the accompanying exemplary drawings.

Figure 2:
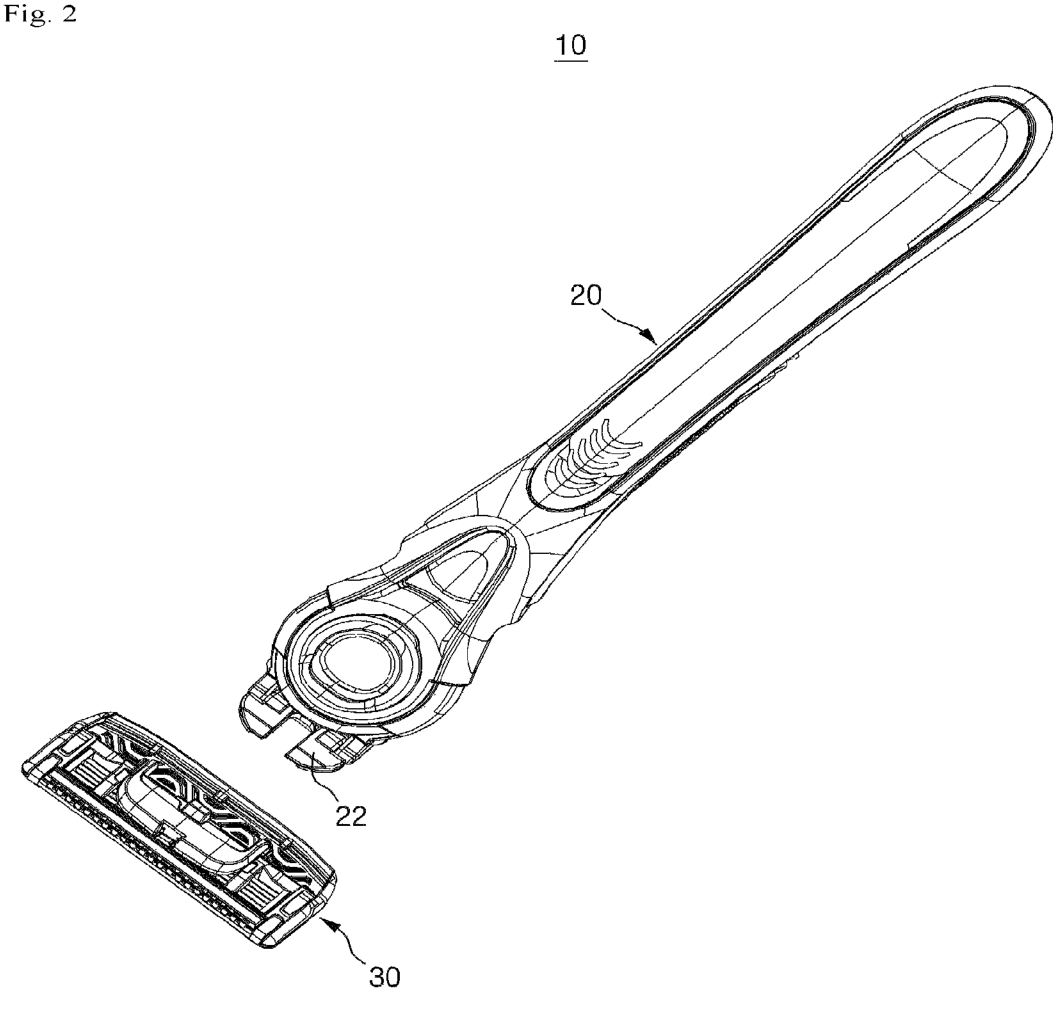
FIG. 2 is an exploded perspective view illustrating a state in which a handle and a cartridge in FIG. 1 are detached.

FIG. 1 is an overall perspective view of a razor according to embodiments of the present disclosure, and FIG. 2 is an exploded perspective view illustrating a state in which a handle and a cartridge in the razor according to the embodiments of the present disclosure are detached.

As illustrated in FIGS. 1 and 2, a razor 10 according to the embodiments of the present disclosure mainly includes a handle 20 and a razor cartridge 30.

The handle 20 is formed in the shape of a long rod so that the handle 20 can be gripped by a hand of a user attempting to shave, and the razor cartridge 30 may be installed at one side of the handle 20 so that the razor cartridge 30 is able to be coupled to the handle 20.

A connector 22 configured to couple the handle 20 and the razor cartridge 30 to a button which is configured to be pushed may be installed at one side of the handle 20.

A plurality of razor blades 302 and a trimmer including at least one trimming blade 305 may be installed in the razor cartridge 30.

First Embodiment

Figure 3:
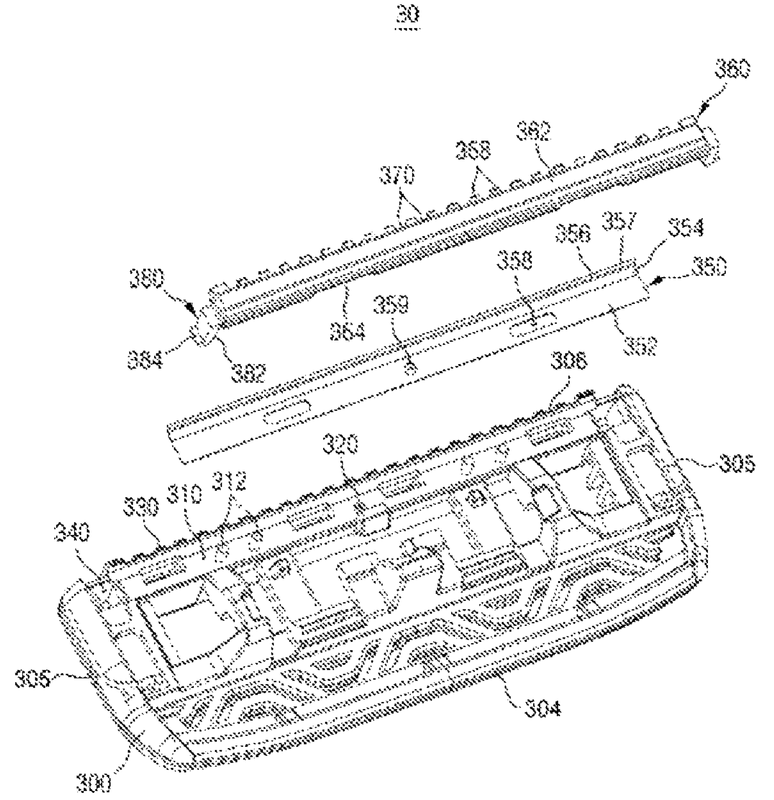
FIGS. 3 to 6 are perspective views sequentially illustrating the relationship in which a trimmer is coupled to a razor cartridge according to a first embodiment of the present disclosure.

FIGS. 3 to 6 are perspective views sequentially illustrating the relationship in which a trimmer is coupled to a razor cartridge according to a first embodiment of the present disclosure. FIG. 3 is a perspective view of a state in which a trimming blade and a trimmer cap that constitute a trimmer are detached from a cartridge frame, and FIGS. 4A and 4B are perspective views of a state in which the trimming blade is seated in the cartridge frame.

Figure 5:
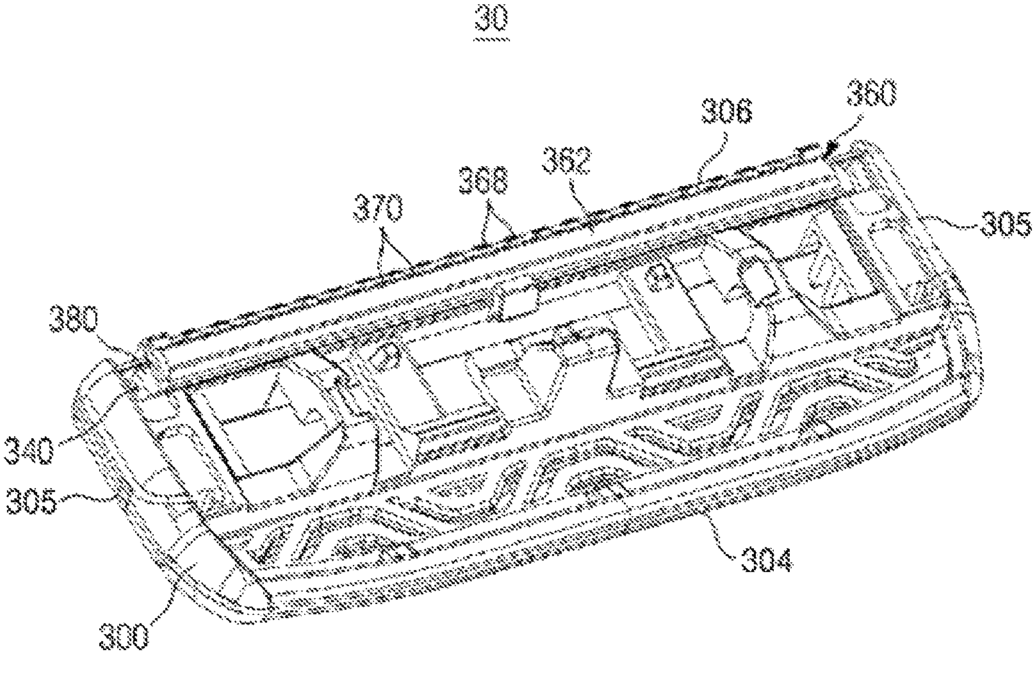
Figure 6:
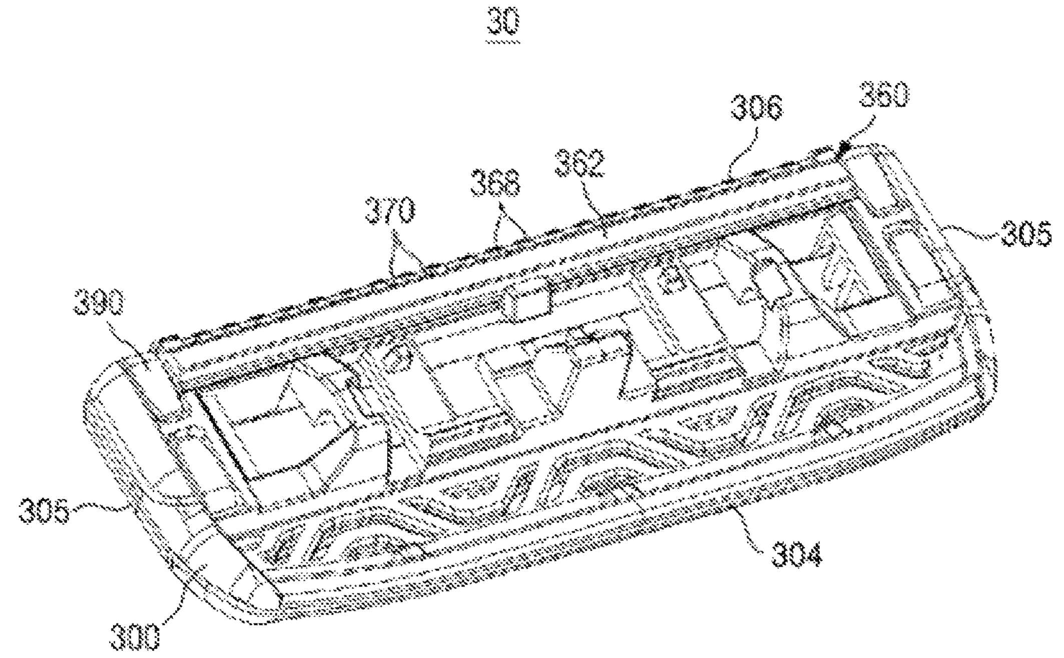

FIG. 5 is a perspective view of a state in which the trimming blade and the trimmer cap are coupled to the cartridge frame, and FIG. 6 is a perspective view of a state in which a fixing member is coupled to the cartridge frame while the trimming blade and the trimmer cap are coupled to the cartridge frame.

Figure 7A:
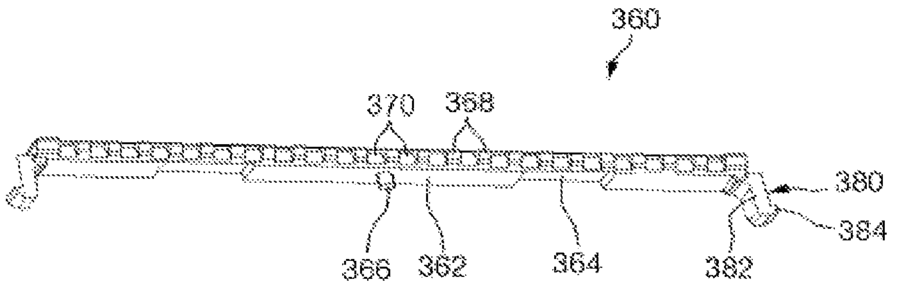
FIGS. 7A and 7B are perspective views of a trimmer cap coupled to the razor cartridge according to the first embodiment of the present disclosure.
Figure 7B:
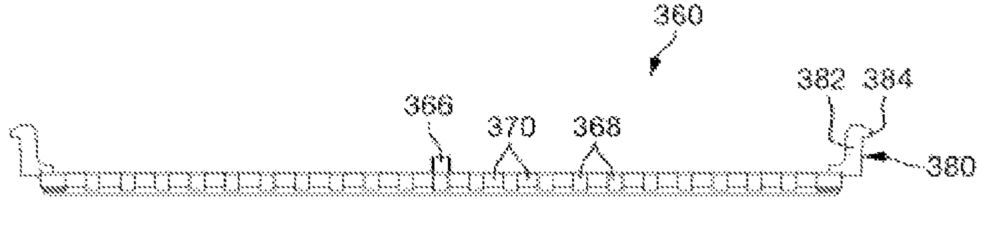

FIGS. 7A and 7B are perspective views of a trimmer cap coupled to the razor cartridge according to the first embodiment of the present disclosure.

Figure 8:
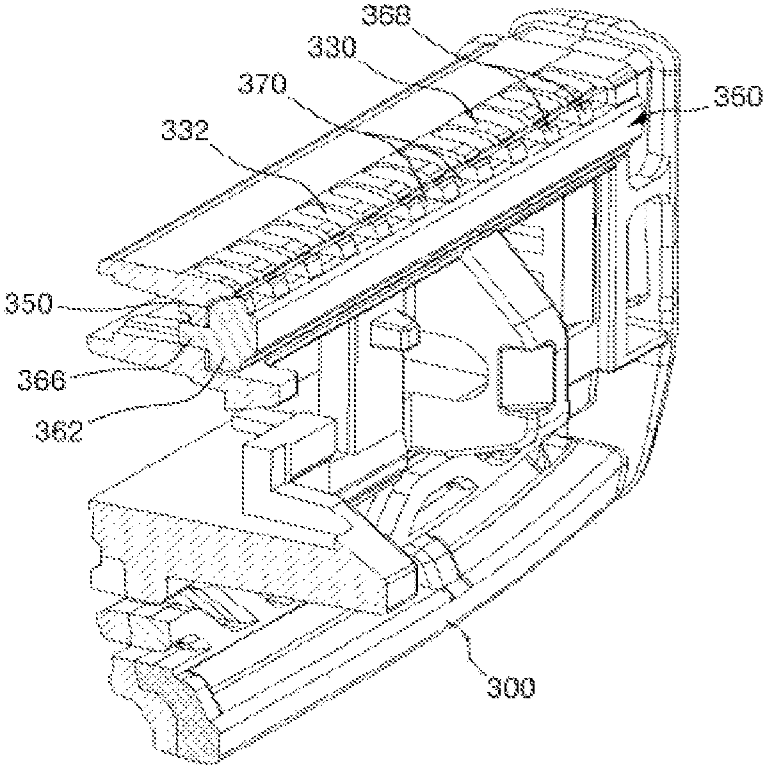
FIG. 8 is a partial cut-away perspective view of a state in which the trimmer is coupled to the razor cartridge according to the first embodiment of the present disclosure.
Figure 9:
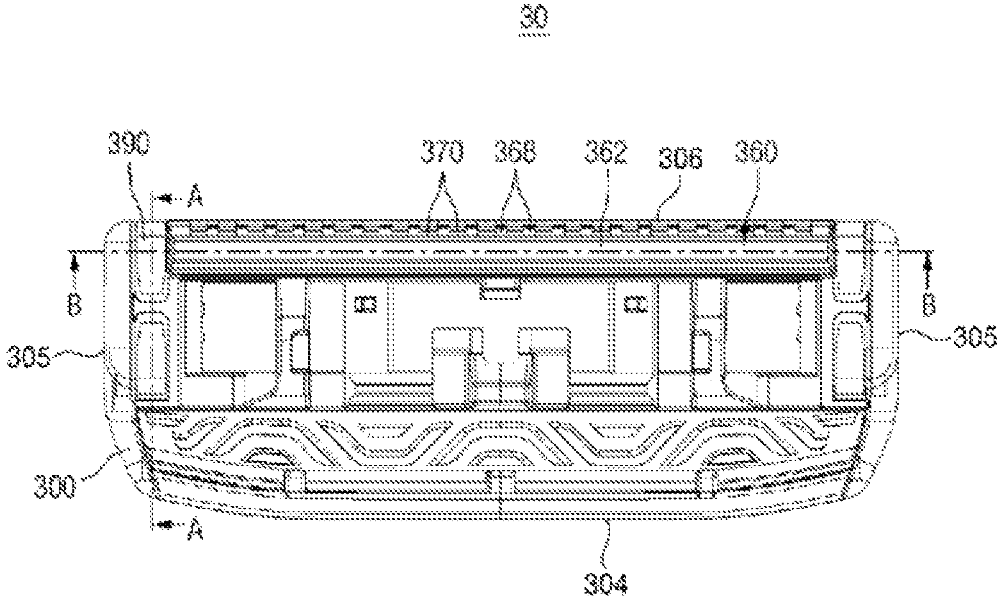
FIG. 9 is a front view of the state in which the trimmer is coupled to the razor cartridge according to the first embodiment of the present disclosure.
Figure 10:
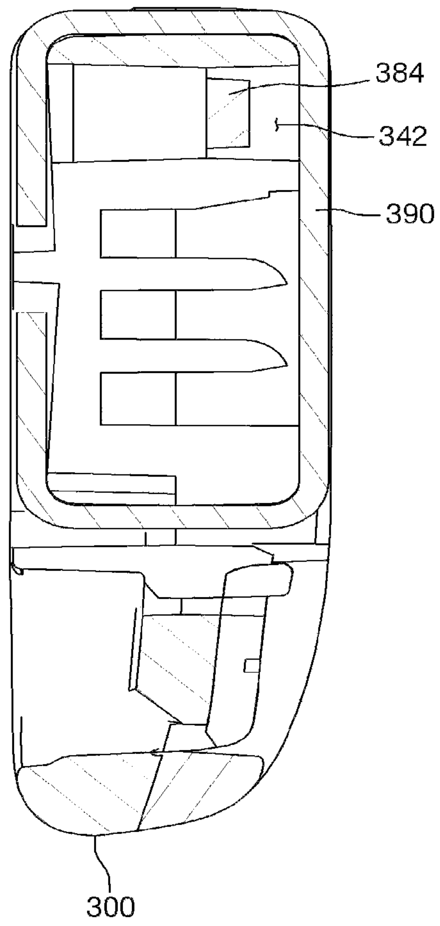
FIG. 10 is a cross-sectional view taken along line A-A in FIG. 9.
Figure 11:
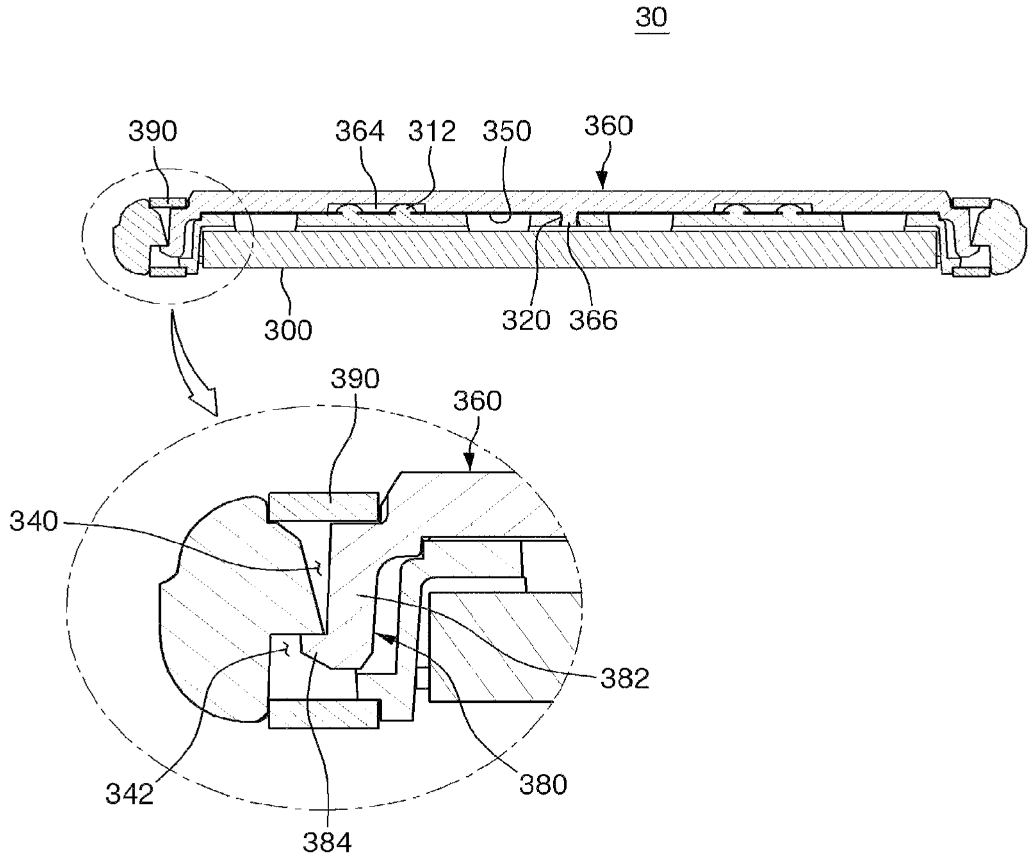
FIG. 11 is a cross-sectional view taken along line B-B in FIG. 9.

FIG. 8 is a partial cut-away perspective view of a state in which the trimmer is coupled to the razor cartridge according to the first embodiment of the present disclosure, FIG. 9 is a front view of the state in which the trimmer is coupled to the razor cartridge according to the first embodiment of the present disclosure, FIG. 10 is a cross-sectional view taken along line A-A in FIG. 9, and FIG. 11 is a cross-sectional view taken along line B-B in FIG. 9.

Figure 12:
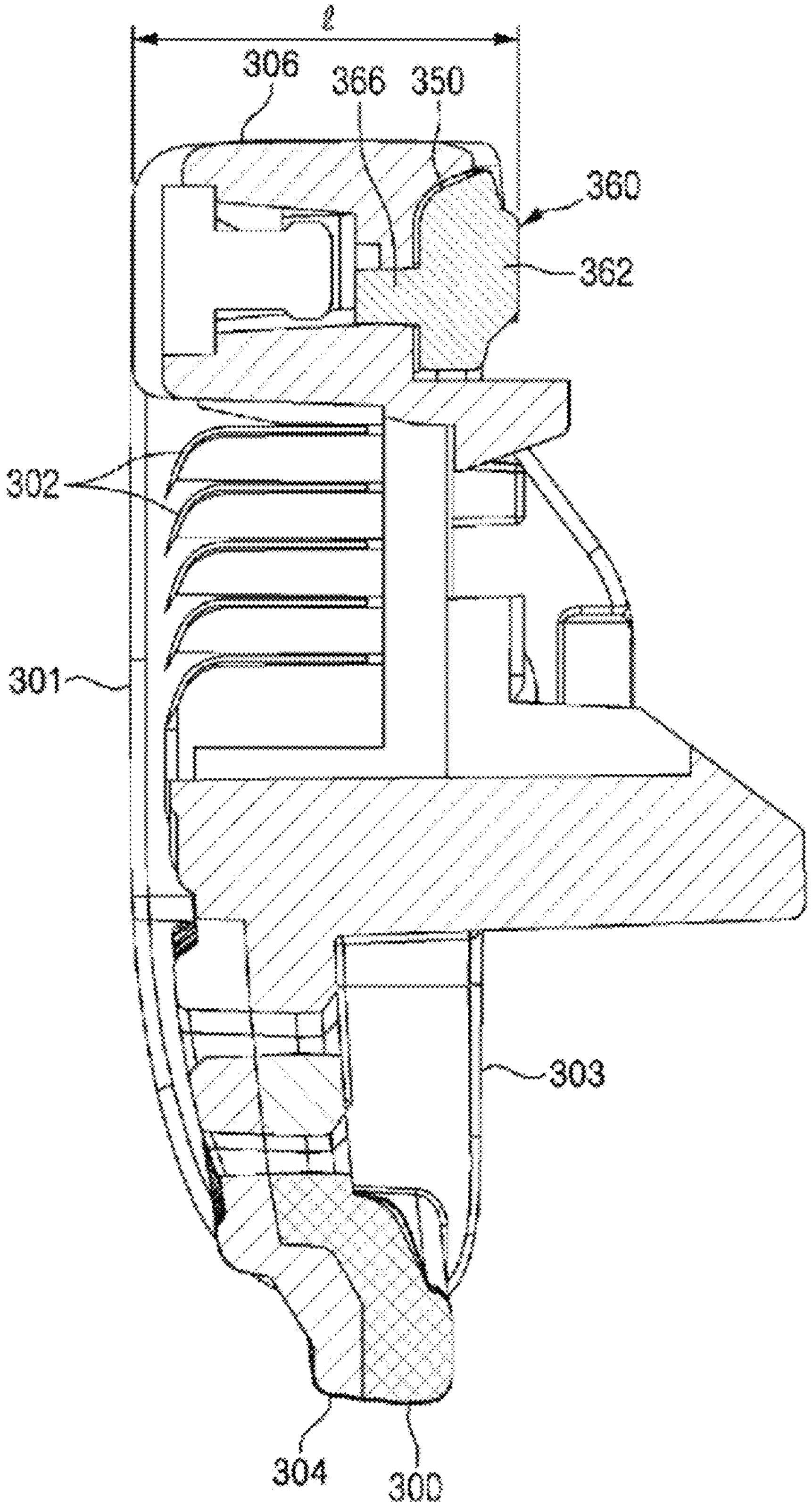
FIG. 12 is a longitudinal cross-sectional view of the state in which the trimmer is coupled to the razor cartridge according to the first embodiment of the present disclosure.

FIG. 12 is a longitudinal cross-sectional view of the state in which the trimmer is coupled to the razor cartridge according to the first embodiment of the present disclosure.

As illustrated in FIGS. 3 to 6, a razor cartridge 30 according to the first embodiment of the present disclosure may include a cartridge frame 300, a plurality of razor blades 302 installed in one direction of the cartridge frame 300, and a trimmer installed in the other direction opposite that of the plurality of razor blades 302. The cartridge frame 300 may include a topmost wall and a bottommost wall. The bottommost wall may be opposite to the topmost wall in a second direction. The second direction may intersect the direction in which the plurality of blades 302 may be installed in the cartridge frame 300. The second direction may intersect the direction in which the trimmer or trimmer blade 350 may be installed in the cartridge frame 300.

The "plurality of razor blades being installed in one direction" means that the plurality of razor blades 302 are installed in the cartridge frame 300 so that edge parts of the plurality of razor blades 302 for performing general shaving are exposed at a front surface or a front external surface of a cartridge.

The "trimmer being installed in the other direction" means that the trimmer is installed in the cartridge frame 300 so that an edge part of a trimming blade 350, which will be described below, is exposed at a rear surface or a rear external surface of the cartridge opposite the front or front external surface.

Therefore, "one direction" refers to a direction toward the front or front external surface of the cartridge for performing general shaving, and "the other direction" refers to a direction toward the rear or rear external surface of the cartridge for performing trimming which is generally opposite the direction toward the front or front external surface.

The razor cartridge 30 may further include a fixing member configured to fix the plurality of razor blades 302 and the trimming blade 350 to the cartridge frame 300, and a clip 390 may be provided as the fixing member in the razor cartridge according to the embodiment of the present disclosure.

The trimmer is installed to be fixed to the cartridge frame 300, and may include the trimming blade 350 and a trimmer cap 360 configured to cover and fix the trimming blade 350.

A seating groove 310 and coupling grooves 340 and 342 may be formed in the cartridge frame 300 so that the trimming blade 350 and the trimmer cap 360 are seated to be fixed and installed.

Referring to FIGS. 3 to 6, the seating groove 310 may be formed at an upper part of one side of the cartridge frame 300 so that the trimming blade 350 and the trimmer cap 360 are seated in the seating groove 310.

In the cartridge frame 300, the seating groove 310 may be formed in a direction opposite that in which the plurality of razor blades 302 are installed. Accordingly, when edge parts of the plurality of razor blades 302 are formed at the front surface of the cartridge, the seating groove 310 of the cartridge frame 300 may be formed at the rear surface of the cartridge.

At least one locking protrusion 312 that protrudes forward may be formed in the seating groove 310, and in this case, two locking protrusions 312 may be formed at each of both sides at a predetermined interval.

Although the case in which two locking protrusions 312 are formed at each of both sides at a predetermined interval in the seating groove 310 of the cartridge frame 300 has been illustrated as an example in the drawings related to the first embodiment of the present disclosure, the number of locking protrusions 312 is not limited thereto.

At least one positioning groove 320 that is recessed may be formed in the seating groove 310. A single positioning groove 320 may be formed at a central portion of the seating groove 310.

Although the case in which only one positioning groove 320 is formed at the central portion of the seating groove 310 has been illustrated as an example in the drawings related to the first embodiment of the present disclosure, the number of positioning grooves 320 and the positions thereof are not limited thereto.

At both ends of the seating groove 310 in the cartridge frame 300, a first coupling groove 340 recessed to a predetermined vertical depth and a second coupling groove 342 formed to horizontally extend outward from the first coupling groove 340 may be formed. Accordingly, a jaw is formed at a boundary between the first coupling groove 340 and the second coupling groove 342, and the coupling relationship therebetween will be described in detail below.

The trimming blade 350 is seated in the seating groove 310 of the cartridge frame 300 and fixed. The trimming blade 350 may be formed of an integrated cutting blade including a support part 352 that is seated in the seating groove 310 and comes into surface contact with the seating groove 310, a bent part 354 formed to be bent from one side of the support part 352, and an edge part 356 extending from the bent part 354 and having a cutting edge 357 formed at an end.

However, the trimming blade 350 is not limited to the above-described integrated cutting blade, and may have various other blade forms such as a flat blade form or a form in which a flat blade is attached to the support part 352.

In the support part 352 of the trimming blade 350, a first through-hole 358 may be formed for the locking protrusions 312, which are formed in the seating groove 310 of the cartridge frame 300, to pass therethrough, and a second through-hole 359 may be formed at a position corresponding to the positioning groove 320 formed in the seating groove 310 of the cartridge frame 300.

A single first through-hole 358 having an elliptical shape may be formed at each of both sides in the support part 352 of the trimming blade 350, and two locking protrusions 312 may pass through the single first through-hole 358.

Figure 4A:
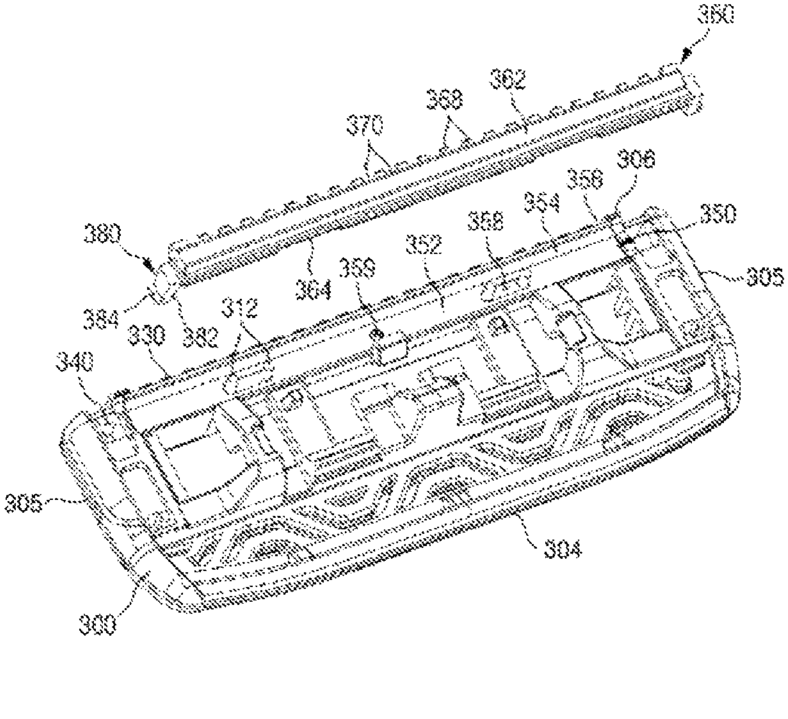

Therefore, the trimming blade 350 may be fixed in a state in which movement thereof is restricted in every direction by the locking protrusions 312 passing through the first through-hole 358 so that, as illustrated in FIG. 4A, one surface of the support part 352 of the trimming blade 350 is seated in the seating groove 310 of the cartridge frame 300 and comes into surface contact with the seating groove 310.

Figure 4B:
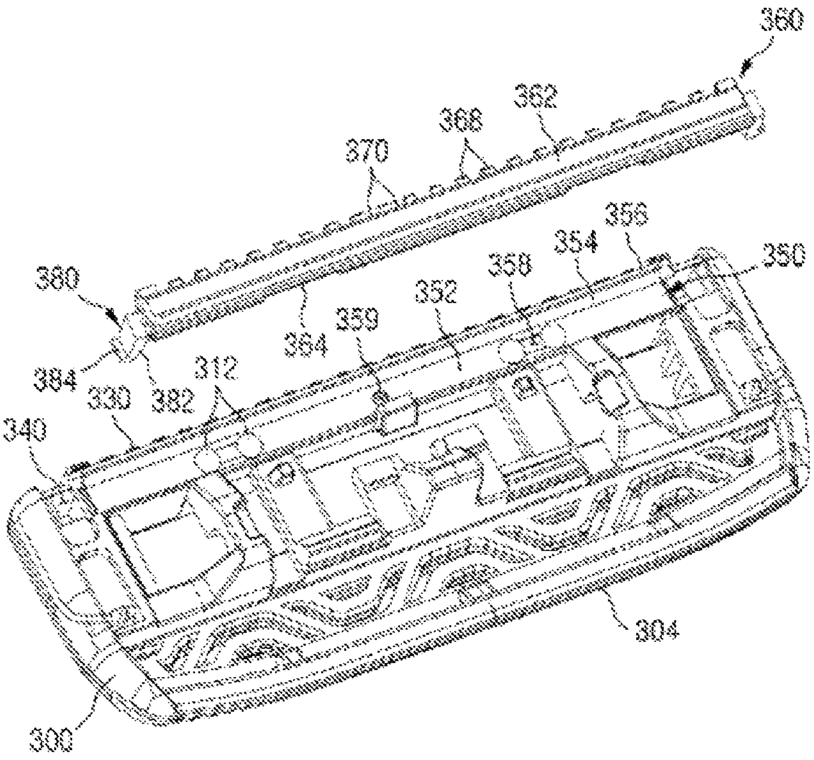

In this state, as illustrated in FIG. 4B, front ends of the locking protrusions 312 are riveted so that the trimming blade 350 is prevented from deviating in the coupling direction, i.e., upward. This operational relationship will be described in detail below.

The trimmer cap 360 may be coupled to the cartridge frame 300 while the trimming blade 350 is disposed between the trimmer cap 360 and the cartridge frame 300. In this case, the trimmer cap 360 may be installed to cover the trimming blade 350 so that the trimmer cap 360 protects and fixes the trimming blade 350.

As illustrated in FIGS. 3, 7A, and 7B, the trimmer cap 360 may include a body part 362 configured to cover the trimming blade 350, and coupling parts 380 formed at both sides of the body part 362 and configured to be coupled to the cartridge frame 300 upon being inserted into each of the first coupling groove 340 and the second coupling groove 342 so that the coupling parts 380 more stably fix the trimming blade 350.

The body part 362 and the coupling parts 380 may be formed with a step therebetween so that heights of the body part 362 and the coupling parts 380 are different. Preferably, the body part 362 and the coupling parts 380 may have a step therebetween so that the height of the coupling parts 380 is lower than that of the body part 362. The coupling parts 380 may include a first coupling part 382 configured to be vertically inserted into the first coupling groove 340 of the cartridge frame 300, and a second coupling part 384 formed to horizontally extend from an end of the first coupling part 382 and configured to be horizontally inserted into the second coupling groove 342 of the cartridge frame 300.

Therefore, in the state in which the coupling parts 380 of the trimmer cap 360 are inserted into each of the coupling grooves 340 and 342 of the cartridge frame 300, the second coupling part 384 of the coupling parts 380 may be locked by a jaw, which is the boundary between the first coupling groove 340 and the second coupling groove 342 of the cartridge frame 300, so that the trimmer cap 360 is prevented from deviating from the cartridge frame 300 in the coupling direction. The coupling relationship thereof will be described in more detail below.

For reference, a distance between the coupling parts 380 formed at both sides of the trimmer cap 360 to face each other may be increased or decreased by elasticity.

In the body part 362 of the trimmer cap 360, an accommodating space 364 recessed to a predetermined depth may be formed at a position corresponding to the locking protrusion 312 of the seating groove 310 and the first through-hole 358 of the trimming blade 350, in a lower surface that directly comes into surface contact with the seating groove 310 of the cartridge frame 300 and the support part 352 of the trimming blade 350.

Therefore, the thickness of the body part 362 at a part in which the accommodating space 364 is formed is smaller than the thickness of the body part 362 at a part in which the accommodating space 364 is not formed.

In the body part 362 of the trimmer cap 360, a positioning protrusion 366 may be formed at a position corresponding to the positioning groove 320 formed in the seating groove 310 of the cartridge frame 300 and the second through-hole 359 of the trimming blade 350.

Although the case in which, in the razor cartridge according to the first embodiment of the present disclosure, the positioning protrusion 366 is formed at the lower surface of the body part 362 of the trimmer cap 360, and the positioning groove 320 is formed at the seating groove 310 of the cartridge frame 300 corresponding to the positioning protrusion 366 has been described above as an example, conversely, a positioning groove may be formed at the lower surface of the body part 362 of the trimmer cap 360, and a positioning protrusion may be formed at the seating groove 310 of the cartridge frame 300 corresponding to the positioning groove.

Combs 368 that protrude to a predetermined height at predetermined intervals may be formed at one side of the body part 362 of the trimmer cap 360. Accordingly, spaces 370 may be formed between the combs 368.

In this case, the combs 368 may be formed in a direction in which the cutting edge 357 of the edge part 356 of the trimming blade 350 is exposed in a state in which the trimmer cap 360 is mounted on the cartridge frame 300 and fixed.

Particularly, in the cartridge frame 300, guide protrusions 330 that align sideburns or facial hair so that shaving is facilitated may be formed at predetermined intervals at one surface of a part at which the trimmer is installed. In this case, the combs 368 may be formed to be aligned and collinear with the guide protrusions 330.

In this case, spaces 332 having a height lower than that of the guide protrusions 330 may be formed between the guide protrusions 330 of the cartridge frame 300, and the spaces 332 may be aligned and collinear with the spaces 370 between the combs 368.

Accordingly, when a user shaves sideburns or facial hair that has grown on a curved part of the face such as under the nose, since, from the cutting edge 357 of the edge part 356 of the trimming blade 350, a cutting edge part at positions at which the combs 368 and the guide protrusions 330 are formed is not exposed to the outside at ordinary times, safety may be significantly improved.

Referring to FIG. 12, the coupling relationship between the plurality of razor blades 302 and the trimming blade 350 may be seen. In other words, the plurality of razor blades 302 are disposed so that edge parts thereof are exposed at the front surface of the cartridge frame 300 while the trimming blade 350 is disposed so that the cutting edge 357 of the edge part 356 thereof is exposed at the rear surface of the cartridge frame 300.

More specifically, the plurality of razor blades 302 are integrated cutting blades in which the support part, the bent part, and the edge part are integrally formed, and in which the support part is coupled and fixed to the cartridge frame 300 so that the support part is substantially vertical to a general shaving plane on which shaving is performed with the razor blades.

The trimming blade 350 is also the integrated cutting blade in which the support part 352, the bent part 354, and the edge part 356 are integrally formed, and in which the support part 352 is coupled and fixed to the cartridge frame 300 so that the support part 352 is substantially parallel to the general shaving plane.

Due to the above configuration, an acute angle may be formed between a general shaving plane defined by tangential planes of front and rear members of the plurality of razor blades 302 and a trimming plane defined by tangential planes of front and rear members of the trimming blade 350.

For reference, although the case in which the plurality of razor blades 302 and the trimming blade 350 are integrated cutting blades has been described as an example, the plurality of razor blades 302 and the trimming blade 350 may also have various other blade forms such as a flat blade form or a form in which a flat blade is coupled to a support body.

Figure 13:
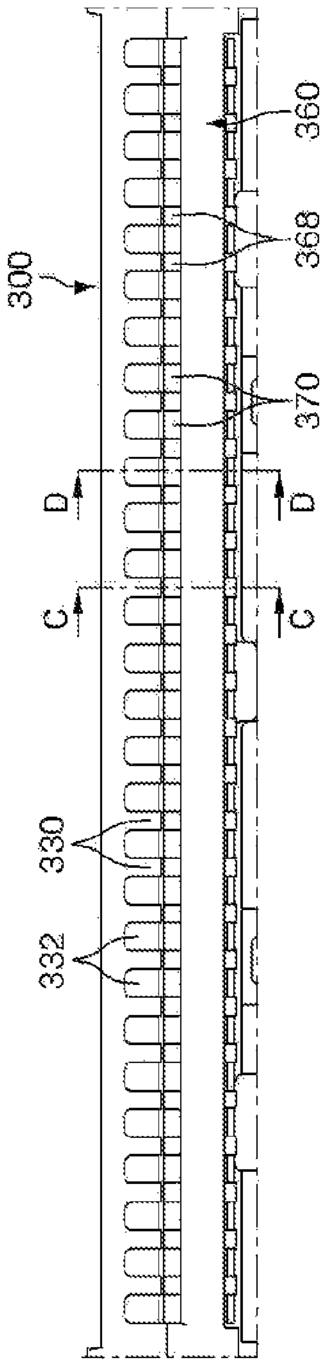
FIG. 13 is a plan view illustrating a state in which, in the razor cartridge according to the first embodiment of the present disclosure, combs formed in the trimmer cap and guide protrusions formed at one side of the cartridge frame are aligned.
Figure 14:
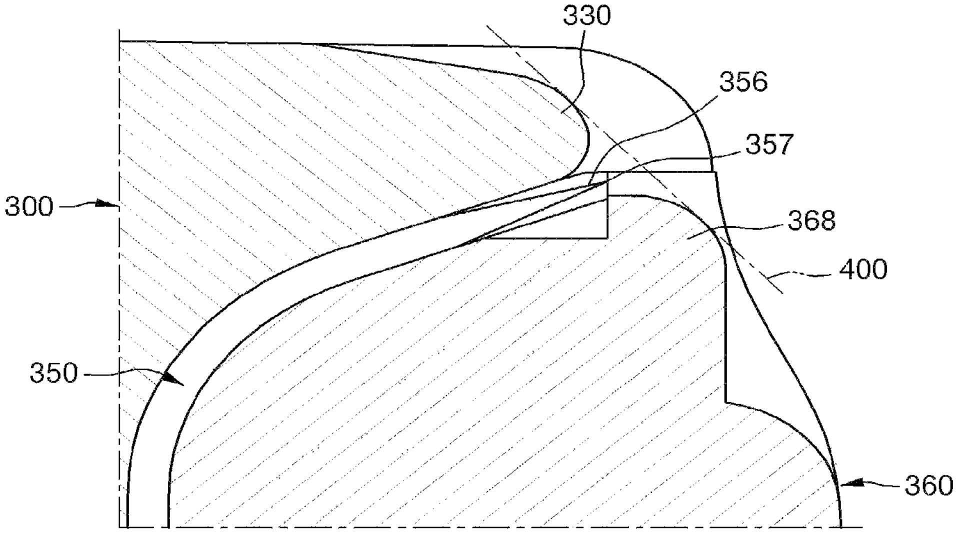
FIG. 14 is a cross-sectional view taken along line C-C in FIG. 13, illustrating the relationship in which an edge part of a trimming blade is placed between the combs and the guide protrusions.
Figure 15:
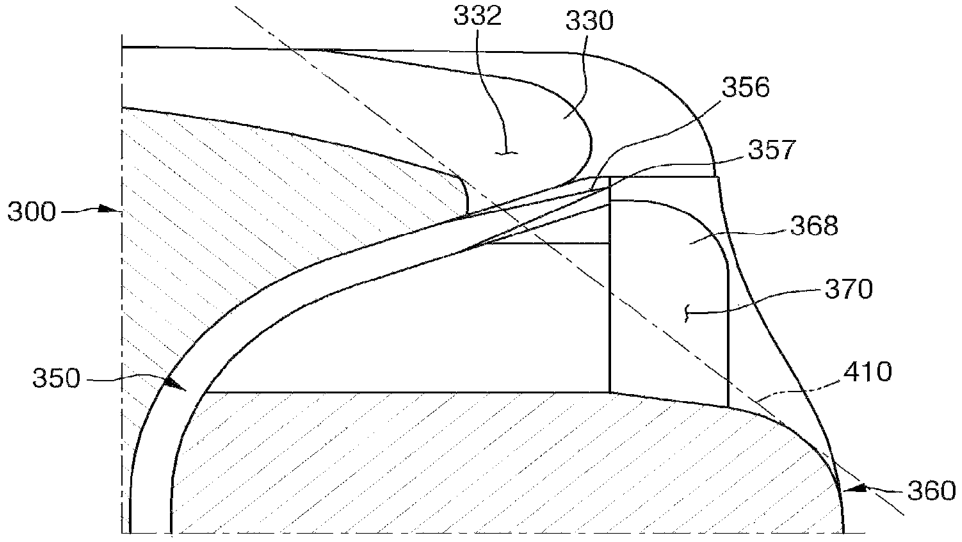
FIG. 15 is a cross-sectional view taken along line D-D in FIG. 13, illustrating the relationship in which the edge part of the trimming blade is placed in spaces between the combs and spaces between the guide protrusions.

FIG. 13 is a plan view illustrating a state in which, in the razor cartridge according to the first embodiment of the present disclosure, combs formed in the trimmer cap and guide protrusions formed at one side of the cartridge frame are aligned, FIG. 14 is a cross-sectional view illustrating the relationship in which an edge part of a trimming blade is placed between the combs and the guide protrusions (a cross-sectional view taken along line C-C in FIG. 13), and FIG. 15 is a cross-sectional view illustrating the relationship in which the edge part of the trimming blade is placed in spaces between the combs and spaces between the guide protrusions (a cross-sectional view taken along line D-D in FIG. 13).

Referring to FIGS. 13 to 15, in the razor cartridge 30, the combs 368 formed in the trimmer cap 360 and the guide protrusions 330 formed at one side of the cartridge frame 300 protrude at a predetermined height so that the cutting edge 357 of the edge part 356 of the trimming blade 350 disposed between the combs 368 and the guide protrusions 330 may be disposed inward from a virtual first plane 400, i.e., at a negative position.

In this case, the virtual first plane 400 may be a line connecting protruding surfaces of the combs 368 to protruding surfaces of the guide protrusions 330. In other words, the first plane 400 is a virtual plane in contact with the skin in a region in which the guide protrusions 330 and the combs 368 are formed when trimming is performed.

A line connecting the spaces 370 between the combs 368 and the spaces 332 between the guide protrusions 330 may be defined as a virtual second plane 410. In this case, the cutting edge 357 of the edge part 356 of the trimming blade 350 may be disposed outward from the second plane 410, i.e., at a positive position. In other words, the second plane 410 is a virtual plane in contact with the skin in a region in which the spaces 370 between the combs 368 and the spaces 332 between the guide protrusions 330 are formed when trimming is performed.

Therefore, when a user presses the trimmer cap 360 against the user's skin and moves the trimmer cap 360 in one direction while the skin is in contact with the virtual first plane 400 illustrated in FIG. 14 to shave sideburns or facial hair that has grown on a curved part of the face such as under the nose using the trimmer, the sideburns or facial hair is aligned by the combs 368 of the trimmer cap 360 and the guide protrusions 330 of the cartridge frame 300, the sideburns or facial hair is gathered in the spaces 370 between the combs 368 and the spaces 332 between the guide protrusions 330, and the sideburns or facial hair gathered as above is shaved by parts of the cutting edge 357 of the edge part 356 of the trimming blade 350 that protrudes outward from the virtual second plane 410 as illustrated in FIG. 15. In this way, safety may be improved.

Although the case in which, in the razor cartridge according to the first embodiment of the present disclosure, the cutting edge 357 of the edge part 356 of the trimming blade 350, which is disposed between the combs 368 and the guide protrusions 330, is disposed inward from the virtual first plane 400, i.e. at the negative position, and the cutting edge 357 of the edge part 356 of the trimming blade 350, which is disposed in the spaces 370 between the combs 368 and the spaces 332 between the guide protrusions 330, is disposed outward from the virtual second plane 410, i.e., at the positive position, has been described above as an example, embodiments are not limited thereto.

For example, the cutting edge 357 of the edge part 356 of the trimming blade, which is disposed between the combs 368 and the guide protrusions 330, may also be disposed on the virtual first plane 400.

The cutting edge 357 of the edge part 356 of the trimming blade 350, which is disposed in the spaces 370 between the combs 368 and the spaces 332 between the guide protrusions 330, may also be disposed on the virtual second plane 410 or disposed inward at a fine interval from the virtual second plane 410.

Even when, as described above, the cutting edge 357 of the edge part 356 of the trimming blade 350, which is disposed in the spaces 370 between the combs 368 and the spaces 332 between the guide protrusions 330, is disposed on the virtual second plane 410 or disposed inward at a fine interval from the virtual second plane 410, the skin is pressed such that a part of the skin on which shaving is performed is able to come into contact with the cutting edge 357 of the edge part 356 of the trimming blade 350. In this way, shaving may be performed while safety is ensured.

The coupling relationship between the cartridge frame 300 configured as above and the trimming blade 350 and the trimmer cap 360 will be described with reference to FIGS. 3 to 6.

First, as illustrated in FIG. 3, in a state in which both the trimming blade 350 and the trimmer cap 360 are detached from the cartridge frame 300, as illustrated in FIG. 4A, the trimming blade 350 is seated in the seating groove 310 of the cartridge frame 300, and then the trimming blade 350 is fixed.

In other words, the support part 352 of the trimming blade 350 is seated in the seating groove 310 of the cartridge frame 300 so that the support part 352 comes into surface contact with the seating groove 310. In this case, since the first through-hole 358 is formed at a position of the support part 352 of the trimming blade 350, corresponding to the locking protrusion 312 formed in the seating groove 310 of the cartridge frame 300, the locking protrusions 312 formed in the seating groove 310 of the cartridge frame 300 protrude in a state in which the locking protrusions 312 have passed through the first through-hole 358.

In the above-described state in which the locking protrusions 312 protrude in the state in which the locking protrusions 312 have passed through the first through-hole 358 formed in the support part 352 of the trimming blade 350, as illustrated in FIG. 4B, front ends of the protruding locking protrusions 312 are riveted so that the front ends are horizontally spread. In this way, the trimming blade 350 is coupled with rivets to the seating groove 310 of the cartridge frame 300.

Accordingly, the trimming blade 350 may remain fixed without being moved in any direction by the locking protrusions 312 of the cartridge frame 300.

In this state, when the trimmer cap 360 is coupled to the cartridge frame 300 as illustrated in FIG. 5, the trimming blade 350 may remain fixed more stably between the trimmer cap 360 and the seating groove 310 of the cartridge frame 300.

When the trimmer cap 360 is coupled to the cartridge frame 300, both coupling parts 380 of the trimmer cap 360 are inserted through the first coupling groove 340 of the cartridge frame 300. Since the second coupling part 384 of both coupling parts 380 horizontally protrudes past the first coupling part 382, an end of the second coupling part 384 is pushed inward after sliding along one surface of the first coupling groove 340 of the cartridge frame 300.

In this case, since the trimmer cap 360 is manufactured with an elastic material as described above, the trimmer cap 360 has some degree of elasticity, and the first coupling part 382 is closed by elasticity.

Next, when the coupling parts 380 are inserted through the first coupling groove 340 of the cartridge frame 300 and the second coupling part 384 reaches the second coupling groove 342 of the cartridge frame 300, the first coupling part 382 is opened as before by an elastic restoration force, and the second coupling part 384 enters the second coupling groove 342 of the cartridge frame 300. Accordingly, the trimmer cap 360 remains longitudinally coupled to the cartridge frame 300 while the trimming blade 350 is disposed between the trimmer cap 360 and the cartridge frame 300 (see FIGS. 10 and 11).

In other words, in a state in which the coupling parts 380 of the trimmer cap 360 are inserted into the coupling grooves 340 and 342 of the cartridge frame 300 by hook coupling, the second coupling part 384 of the coupling parts 380 is locked by the jaw, which is the boundary between the first coupling groove 340 and the second coupling groove 342 of the cartridge frame 300, so that the trimmer cap 360 remains coupled to the cartridge frame 300 without being detached therefrom in the coupling direction.

In this case, since the riveted front end parts of the locking protrusions 312 are disposed in the accommodating space 364 that is recessed to a predetermined depth in a lower surface of the body part 362 of the trimmer cap 360, the body part 362 of the cap 360 is not spaced apart from the trimming blade 350 when the body part 362 is seated in the seating groove 310 of the cartridge frame 300 while the trimming blade 350 is disposed between the body part 362 and the seating groove 310.

Simultaneously, the positioning protrusion 366 formed at the lower surface of the body part 362 of the trimmer cap 360 passes through the second through-hole 359 of the trimming blade 350 and is inserted into the positioning groove 320 formed in the seating groove 310 of the cartridge frame 300 so that the positioning protrusion 366 is coupled to the positioning groove 320.

Since, as described above, the coupling parts 380 of the trimmer cap 360 are coupled to the coupling grooves 340 and 342 of the cartridge frame 300 by hook coupling while the trimming blade 350 is disposed between the coupling parts 380, and the positioning protrusion 366 of the trimmer cap 360 is inserted into the positioning groove 320 of the cartridge frame 300 so that the positioning protrusion 366 is coupled to the positioning groove 320, a binding force between the trimmer cap 360 and the cartridge frame 300 is enhanced.

Therefore, the trimming blade 350 interposed between the body part 362 of the trimmer cap 360 and the seating groove 310 of the cartridge frame 300 may remain fixed more stably without being moved.

Since the trimming blade 350 remains stably fixed between the trimmer cap 360 and the seating groove 310 of the cartridge frame 300, the cutting edge 357 of the edge part 356 of the trimming blade 350 is not exposed to the outside by the combs 368 and the guide protrusions 330 in a state in which a predetermined pressure is not applied to the trimmer cap 360 for shaving. Due to the trimming blade 350 remaining stably fixed, the durability of the trimming blade 350 may also be significantly improved.

When the trimmer cap 360 is coupled to the cartridge frame 300 with the trimming blade 350 disposed between the cartridge frame 300 and the trimmer cap 360 and the clip 390 is gripped so that the clip 390 surrounds the plurality of razor blades 302 and the coupling parts 380 of the trimmer cap 360, the plurality of razor blades 302 and the trimming blade 350 are stably fixed and coupled to each other.

In this case, instead of being directly fixed by the clip 390, the trimming blade 350 is fixed by the clip 390 surrounding front ends of the coupling parts 380 of the trimmer cap 360. In this way, the overall length of the trimming blade 350 may be decreased.

In other words, since the trimming blade 350 remains fixed, without being moved, by the locking protrusion 312 of the cartridge frame 300 passing through the first through-hole 358 of the support part 352 and the positioning protrusion 366 of the trimmer cap 360 passing through the positioning groove 320 of the support part 352, there is no need to fix both ends of the trimming blade 350 with the clip 390 as in a conventional case, and the overall length of the trimming blade 350 may be shortened.

When the overall length of the trimming blade 350 is decreased as described above, interference between the trimming blade 350 and the clip 390 is removed so that, as illustrated in FIGS. 8 and 12, a thickness of a part of the cartridge frame 300 in which the trimmer is disposed may be reduced. Accordingly, shaving facial hair that has grown on a curved part of the face such as under the nose is facilitated, and the functionality of the razor cartridge 30 may be significantly improved.

Although the form in which, as illustrated in FIG. 6, one end of the clip 390 is inserted into a through-hole formed in the cartridge frame 300, and the other end of the clip 390 surrounds one end of the cartridge frame 300 while surrounding the front ends of the coupling parts 380 of the trimmer cap 360 has been described as an example, embodiments are not limited thereto.

In other words, both ends of the clip 390 may be configured to surround both sides of the cartridge frame 300, or both ends of the clip 390 may be configured to pass through a through-hole formed in the cartridge frame 300.

However, since the trimmer is disposed at a front end portion of one side at the rear surface of the cartridge frame 300, it may be advantageous in terms of spatial efficiency for one end of the clip 390 surrounding the front ends of the coupling parts 380 of the trimmer cap 360 to be configured to surround one end at the rear surface of the cartridge frame 300.

Second Embodiment

Figure 16:
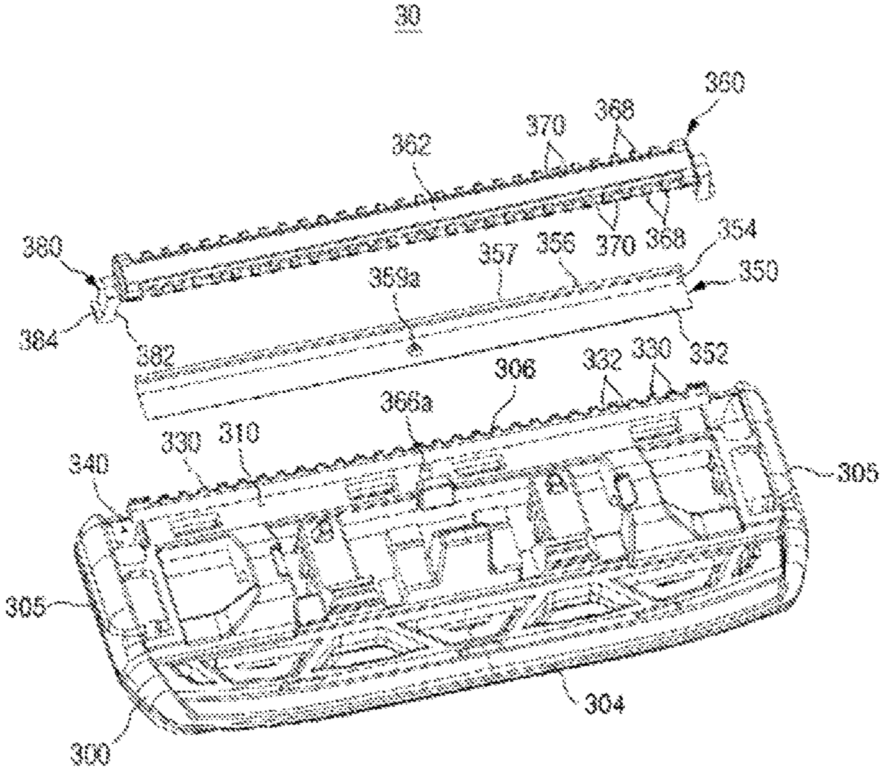
FIGS. 16 to 19 are perspective views sequentially illustrating the relationship in which a trimmer is coupled to a razor cartridge according to a second embodiment of the present disclosure.
Figure 17:
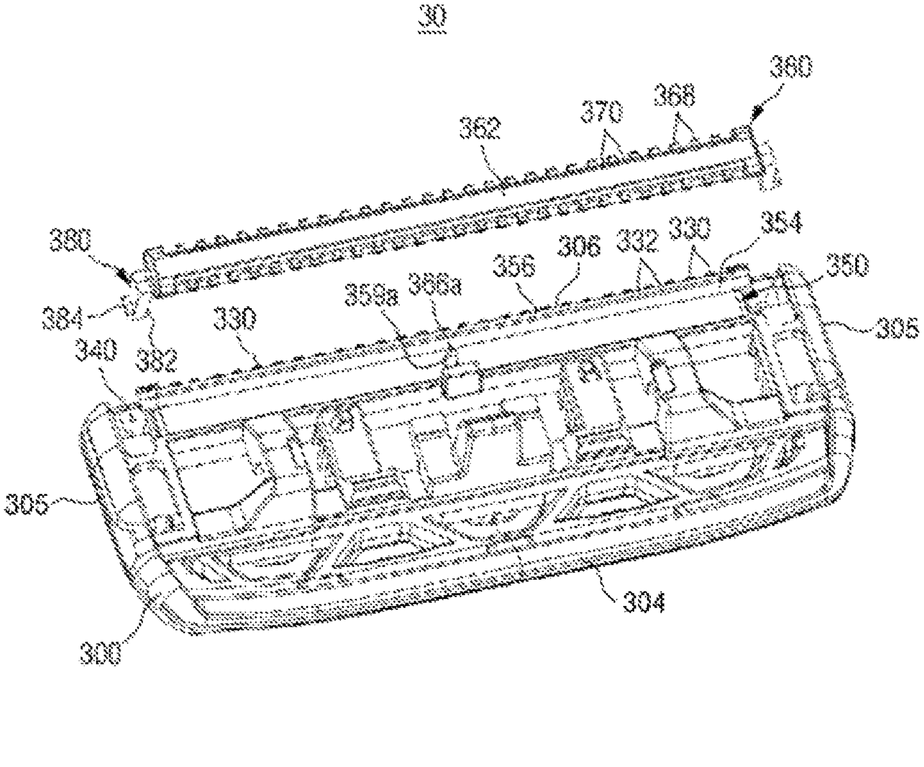

FIGS. 16 to 19 are perspective views sequentially illustrating the relationship in which a trimmer is coupled to a razor cartridge according to a second embodiment of the present disclosure. FIG. 16 is a perspective view of a state in which a trimming blade and a trimmer cap constituting the trimmer are detached from a cartridge frame, and FIG. 17 is a perspective view of a state in which the trimming blade is seated on the cartridge frame.

Figure 18:
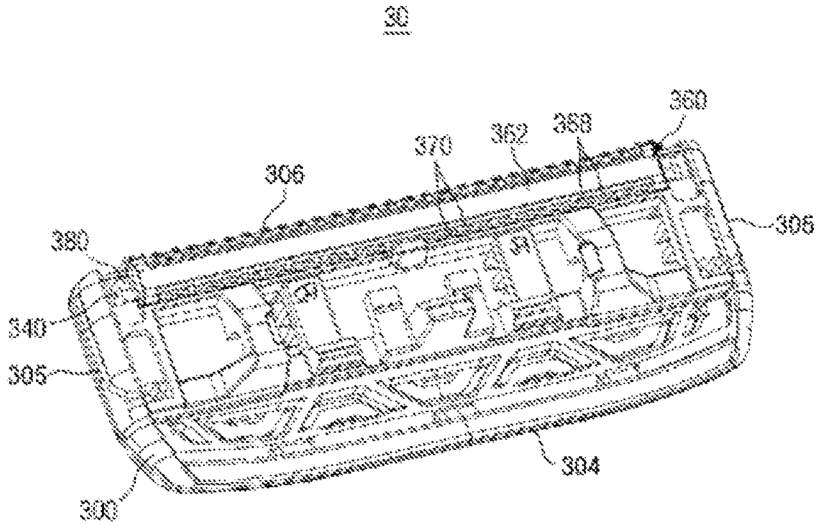
Figure 19:
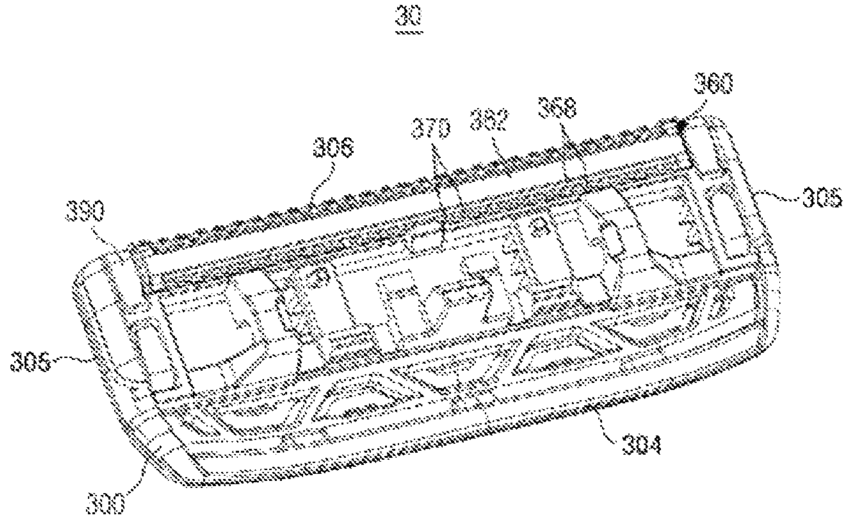

FIG. 18 is a perspective view of a state in which the trimming blade and the trimmer cap are coupled to the cartridge frame, and FIG. 19 is a perspective view of a state in which a clip is coupled to the cartridge frame while the trimming blade and the trimmer cap are coupled to the cartridge frame.

Figure 20:
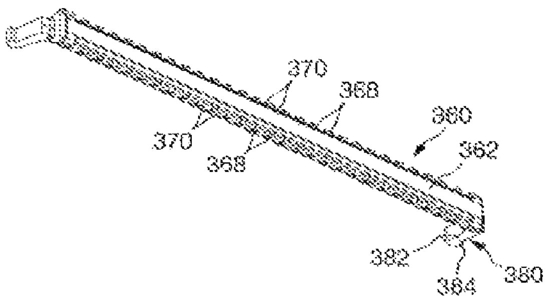
FIG. 20 is a perspective view of a trimmer cap coupled to the razor cartridge according to the second embodiment of the present disclosure.

FIG. 20 is a perspective view of the trimmer cap coupled to the razor cartridge according to the second embodiment of the present disclosure.

Figure 21:
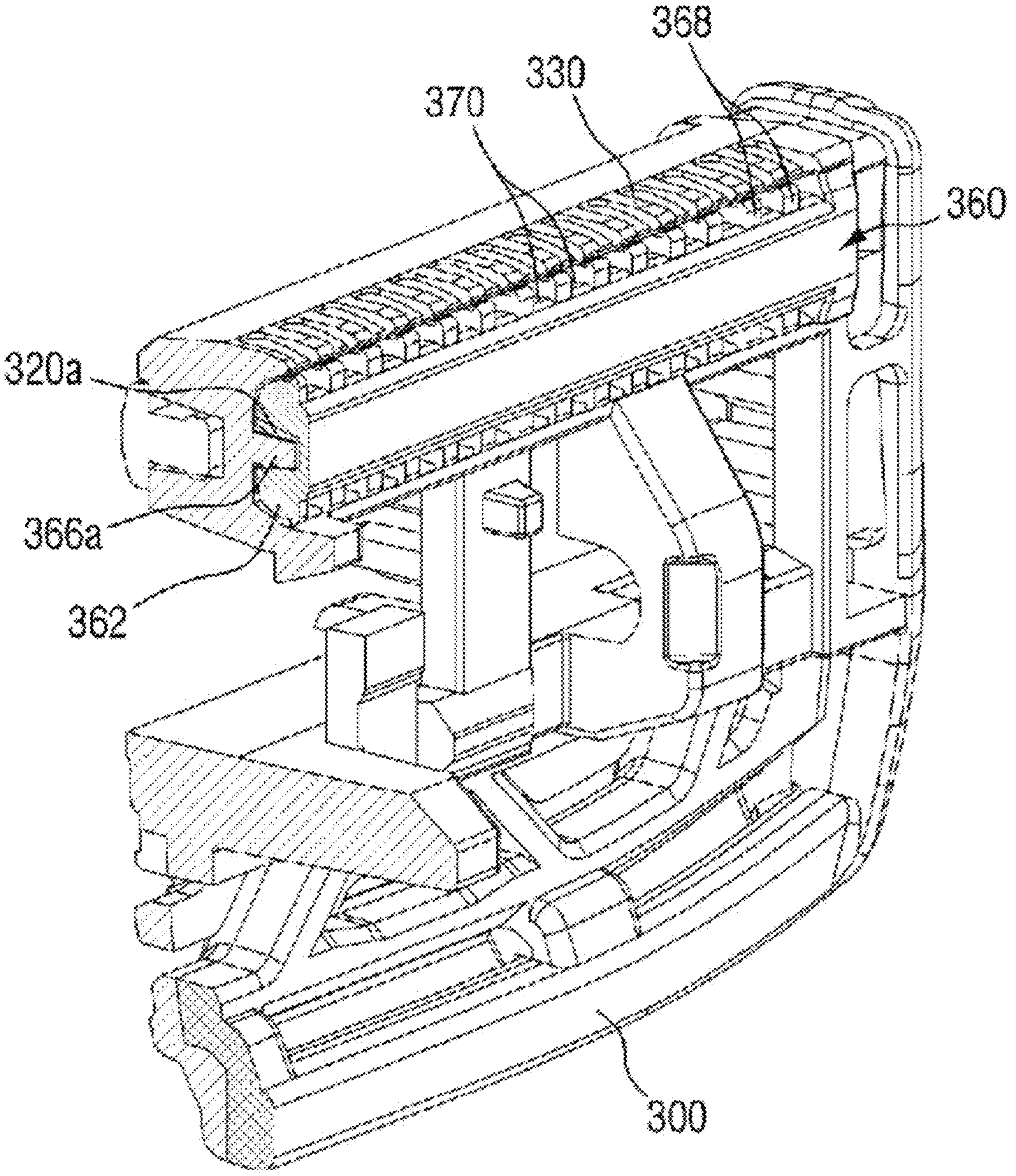
FIG. 21 is a partial cut-away perspective view of a state in which the trimmer is coupled to the razor cartridge according to the second embodiment of the present disclosure.

FIG. 21 is a partial cut-away perspective view of a state in which the trimmer is coupled to the razor cartridge according to the second embodiment of the present disclosure.

For reference, in describing the razor cartridge according to the second embodiment of the present disclosure, like reference numerals will be assigned to elements that are the same as those of the razor cartridge according to the first embodiment described above.

In comparison to the razor cartridge according to the first embodiment described above, the razor cartridge according to the second embodiment of the present disclosure has a different structure for coupling a trimming blade 350 and a trimmer cap 360 to a cartridge frame 300. This will be described in detail below.

As illustrated in FIGS. 16 to 19, a razor cartridge 30 according to the second embodiment of the present disclosure may include the cartridge frame 300, a plurality of razor blades 302 installed in one direction in the cartridge frame 300, and a trimmer installed in the other direction opposite that of the plurality of razor blades 302.

The razor cartridge 30 may further include a clip 390 configured to fix the plurality of razor blades 302 and the trimming blade 350 to the cartridge frame 300.

The trimmer is installed to be fixed to the cartridge frame 300, and may include the trimming blade 350 and a trimmer cap 360 configured to cover and fix the trimming blade 350.

A seating groove 310 and coupling grooves 340 and 342 may be formed in the cartridge frame 300 so that the trimming blade 350 and the trimmer cap 360 are seated to be fixed and installed.

Referring to FIGS. 3 to 6, the seating groove 310 may be formed at an upper part of one side of the cartridge frame 300 so that the trimming blade 350 and the trimmer cap 360 are seated in the seating groove 310.

In the cartridge frame 300, the seating groove 310 may be formed in a direction opposite that in which the plurality of razor blades 302 are installed. Accordingly, when edge parts of the plurality of razor blades 302 are formed at the front surface of the cartridge, the seating groove 310 of the cartridge frame 300 may be formed at the rear surface of the cartridge.

An insertion protrusion **366*a* that protrudes forward a predetermined length may be formed at a central portion of the seating groove 310**.

The trimming blade 350 is seated in the seating groove 310 of the cartridge frame 300 and fixed. The trimming blade 350 may be formed of an integrated cutting blade including a support part 352 that is seated in the seating groove 310 and comes into surface contact with the seating groove 310, a bent part 354 formed to be bent from one side of the support part 352, and an edge part 356 extending from the bent part 354 and having a cutting edge 357 formed at an end.

In this case, a communication hole **359*a* may be formed in the support part 352 of the trimming blade 350 for the insertion protrusion 366*a* formed in the seating groove 310 of the cartridge frame 300** to pass therethrough.

The trimmer cap 360 is coupled to the cartridge frame 300 while the trimming blade 350 is disposed between the trimmer cap 360 and the cartridge frame 300. In this case, the trimmer cap 360 may be installed to cover the trimming blade 350 so that the trimmer cap 360 protects the trimming blade 350.

As illustrated in FIGS. 16 and 20, the trimmer cap 360 may include a body part 362 configured to cover the trimming blade 350, and coupling parts 380 formed at both sides of the body part 362 and configured to be coupled to the cartridge frame 300 upon being inserted into each of the first coupling groove 340 and the second coupling groove 342 so that the coupling parts 380 more stably fix the trimming blade 350.

At the lower surface of the body part 362 of the trimmer cap 360, an insertion groove **230*a* may be formed at a position corresponding to the insertion protrusion 366*a* protruding from the seating groove 310 and the communication hole 359*a* formed in the trimming blade 350 (see FIG. 21**).

Combs 368 that protrude to a predetermined height at predetermined intervals may be formed at corner portions at both sides of the body part 362 of the trimmer cap 360. Accordingly, spaces 370 may be formed between the combs 368.

In other words, as illustrated in FIG. 20, the combs 368, which protrude to a predetermined height at predetermined intervals, may be formed symmetrically at the corner portions at both sides of the body part 362 of the trimmer cap 360.

The coupling parts 380 formed at both ends of the body part 362 may also be formed symmetrically to each other.

Therefore, in the razor cartridge according to the second embodiment of the present disclosure, when the trimmer cap 360 is coupled to the seating groove 310 of the cartridge frame 300, the trimmer cap 360 may be assembled to the seating groove 310 in any direction including directions toward a front surface and a rear surface of the cartridge.

The trimmer cap 360 is mass-produced as a single product, the cartridge frame 300 is also mass-produced as a single product, and the trimmer cap 360 and the cartridge frame 300 are assembled to each other, and therefore when the combs 368 are formed to be symmetrical at both sides of the body part 362 of the trimmer cap 360, the combs 368 are aligned to guide protrusions 330 of the cartridge frame 300 regardless of the direction in which the trimmer cap 360 is assembled to the cartridge frame 300 including directions toward a front surface and a rear surface of the cartridge. In this way, assemblability is improved, and thus productivity is significantly improved.

Since a process of shaving sideburns or facial hair that has grown on a curved part of the face by varying the extent of protrusion of a cutting edge 357 of an edge part 356 of the trimming blade 350 by the combs 368 and the guide protrusions 330, spaces 370 between the combs 368, and spaces 332 between the guide protrusions 330 is identical to that according to the first embodiment described above, repeated description thereof will be omitted.

Since, in the razor cartridge according to the second embodiment of the present disclosure, the coupling configuration between the coupling parts 380 formed at both sides of the body part 362 of the trimmer cap 360 and the coupling grooves 340 and 342 of the cartridge frame 300 and a coupling method thereof are identical to those according to the first embodiment described above, repeated description thereof will be omitted.

However, in the razor cartridge according to the second embodiment of the present disclosure, as described above, the insertion protrusion **366*a* is formed at the central portion of the seating groove 310 of the cartridge frame 300, the communication hole 359*a* is formed in the trimming blade 350, and the insertion groove 320*a* is formed in the lower surface of the body part 362 of the trimmer cap 360 so that, as the insertion protrusion 366***a* passes through the communication hole 359*a* and is inserted into the insertion groove 320*a*, the cartridge frame 300 and the trimmer cap 360 may be easily assembled while the trimming blade 350 is interposed between the cartridge frame 300 and the trimmer cap 360.

For reference, although the case in which, in the razor cartridge according to the second embodiment of the present disclosure, the insertion protrusion 366*a* is formed in the seating groove 310 of the cartridge frame 300, and the insertion groove 320*a* is formed at the lower surface of the body part 362 of the trimmer cap 360 has been described above as an example, conversely, the insertion groove may be formed in the seating groove 310 of the cartridge frame 300 while the insertion protrusion is formed in the lower surface of the body part 362 of the trimmer cap 360.

Although the case in which a single insertion protrusion 366*a* and a single insertion groove 320*a* are formed has been described above as an example, a plurality of insertion protrusions 366*a* and a plurality of insertion grooves 320*a* may be formed to correspond to each other at predetermined intervals.

Those of ordinary skill in the art to which the present disclosure pertains should understand that the present disclosure may be embodied in other specific forms without changing the technical spirit or essential features of the present disclosure. Therefore, the embodiments described above should be understood as illustrative in all aspects instead of limiting. The scope of the present disclosure is indicated by the claims below rather than by the detailed description above, and the meaning, scope, and all changes or modifications derived from concepts equivalent to the claims should be interpreted as belonging to the scope of the present disclosure.

What is claimed is:

1. A razor cartridge comprising:

a cartridge frame, comprising:

a front external surface and a rear external surface, a bottommost wall and a topmost wall, and a right side wall and a left side wall;

a plurality of razor blades having a cutting edge exposed at the front external surface; and a trimmer mounted to the rear external surface, the trimmer including a trimming blade having a trimming edge exposed at the rear external surface and a trimmer cap, wherein the rear external surface is opposite to the front external surface in a first direction, wherein the bottommost wall is opposite to the topmost wall in a second direction intersecting the first direction, wherein the right side wall is opposite to the left side wall in a third direction, the right side wall and the left side wall intersect the topmost wall and the bottommost wall, wherein the trimming blade is mounted in a seating groove formed at the rear external surface, wherein the trimmer cap extends from the rear external surface towards the front external surface, and wherein all of the seating groove, the trimming blade, and the trimmer cap are disposed closer to the topmost wall than a last razor blade of the plurality of razor blades is to the topmost wall in the second direction.

2. The razor cartridge of claim 1, wherein the trimmer cap is at the rear external surface such that the trimming blade is disposed between the trimmer cap and the seating groove.

3. The razor cartridge of claim 1, wherein the trimming blade includes:

a support part seated in the seating groove;

a bent part bent from one side of the support part; and an edge part extending from the bent part and having the trimming edge formed at an end thereof.

4. The razor cartridge of claim 3, wherein the support part is parallel to a general shaving plane on which shaving is performed by the plurality of razor blades.

5. The razor cartridge of claim 1, wherein at least a portion of the trimmer cap is configured to penetrate at least a portion of the trimming blade.

6. The razor cartridge of claim 1, wherein at least a portion of the seating groove comprises at least one protrusion protruding in the first direction, and wherein the at least one protrusion is configured to extend through at least a portion of the trimming blade.

7. The razor cartridge of claim 1, wherein a trimming plane is defined by a plane tangent to the trimmer cap, and wherein the trimmer cap covers the trimming blade and cartridge frame.

8. The razor cartridge of claim 1, wherein a trimming plane is defined by a plane tangent to the trimmer cap and the cartridge frame.

9. The razor cartridge of claim 1, wherein the seating groove is formed at an upper area of the rear external surface of the cartridge frame.

10. The razor cartridge of claim 1, wherein a first side of the trimming blade is in surface contact with the seating groove and a second side of the trimmer cap is in surface contact with the trimmer cap.

11. The razor cartridge of claim 1, wherein the trimmer cap is configured to cover and fix the trimming blade to the cartridge frame.

12. The razor cartridge of claim 1, wherein coupling grooves are formed in the rear external surface of the cartridge frame, and wherein the trimmer cap is coupled to the coupling grooves.

13. The razor cartridge of claim 12, wherein the trimmer cap comprises coupling parts formed at a rightmost edge and a leftmost edge of the trimmer cap.

14. The razor cartridge of claim 1, wherein the trimmer cap comprises a body part, and wherein the body part is exposed adjacent to the rear external surface of the cartridge frame.

15. The razor cartridge of claim 1, wherein the trimmer cap comprises a plurality of combs formed in a direction in which the trimming edge extends.

* * * * *